(12) United States Patent
Yang

(10) Patent No.: US 6,903,536 B2
(45) Date of Patent: Jun. 7, 2005

(54) PFC-PWM CONTROLLER HAVING INTERLEAVED SWITCHING

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 10/712,274

(22) Filed: Nov. 12, 2003

(65) Prior Publication Data

US 2005/0099164 A1 May 12, 2005

(51) Int. Cl.[7] ............................................... G05F 1/44
(52) U.S. Cl. ...................................................... 323/266
(58) Field of Search ................................ 323/265, 266, 323/268, 271, 272, 282, 284, 285, 288, 299, 300

(56) References Cited

U.S. PATENT DOCUMENTS 5,565,761 A    10/1996  Hwang ........................ 323/222
5,870,294 A  *  2/1999  Cyr ............................. 363/41
6,700,764 B2 *  3/2004  Tan ............................ 361/91.1

* cited by examiner

Primary Examiner—Gary L. Laxton
(74) Attorney, Agent, or Firm—J.C. Patents (57) ABSTRACT

The present invention discloses a PFC-PWM controller having interleaved switching. A PFC stage generates a PFC signal for switching a PFC boost converter of a power converter. A PWM stage generates a PWM signal for switching a DC-to-DC converter of the power converter. The PFC-PWM controller includes a power manager for generating a discharge current and a burst-signal. Under light-load conditions, the discharge current decreases in proportion to a load of the power converter. The burst signal is utilized to disable the PFC signal in a suspended condition for power saving. A pulse width of the pulse-signal ensures a dead time to spread switching signals, such as the PFC and PWM signals, and reduces switching noise. When the discharge current decreases, the pulse width of the pulse-signal will increase and a frequency of the pulse-signal will decrease correspondingly. This further reduces power consumption under light-load and zero-load conditions.

14 Claims, 9 Drawing Sheets

FIG. 9

PFC-PWM CONTROLLER HAVING INTERLEAVED SWITCHING

BACKGROUND OF THE INVENTION

1. Field of the Invention

The present invention generally relates to the field of switching mode power converters. More particularly, the present invention relates to PFC-PWM controllers.

2. Description of the Prior Art

The purpose of Power Factor Correction (PFC) is to correct a line current of a power supply. Power Factor Correction produces a sinusoidal input current waveform that is in phase with a line input voltage. With a PFC circuitry in a front-end of the power supply, a DC-to-DC converter can significantly reduce power loss and heat dissipation in power contribution systems.

Recently enacted environmental regulations in the U.S. and in Europe not only require most consumer products to have built-in PFC function, but also strictly limit overall power consumption. Specifically, the amount of power consumption permitted for supervising and remote control purposes has been significantly reduced. Therefore, reducing power consumption under standby mode becomes a major concern among electronics manufacturers.

Traditional DC-to-DC converters with PFC function still have high power consumption under light-load and zero-load conditions. Because of this, many present-day electronic product designs are not compliant with power conservation requirements. Furthermore, when the PFC circuitry is cascaded with PWM (pulse width modulation) circuitry, significant switching interference and EMI (electrical-magnetic interference) could occur. To alleviate these problems, most DC-to-DC converters incorporate a PWM circuitry having some form of synchronous switching.

One method of synchronizing PFC and PWM signals is described in U.S. Pat. No. 5,565,761 (Hwang). Hwang discloses a leading-edge and trailing-edge modulation technique, in which the PFC boost converter switches (the first stage) and the DC-to-DC power converter switches (the second stage) are turned on and off at the same time. This minimizes the duration of the temporary zero-load period and reduces the magnitude of the ripple voltage delivered to the load.

However, one drawback of Hwang's invention is that power consumption is not reduced under light-load and zero-load conditions. Another drawback of Hwang's invention is poor output response to dynamic loads because of the duty cycle of the second stage being not directly controlled by the output voltage.

Furthermore, Hwang's invention teaches a DC-to-DC power converter having a dc ok comparator coupled to the first stage. The dc ok comparator prevents the second stage from turning on if the output voltage of the first stage is below a threshold value. However, the dc ok comparator is sensitive to noise interference. Spike and overshoot signals can incorrectly turn on the second stage.

Another drawback of Hwang's invention is that it generates significant noise and EMI during leading edge and trailing edge switching. To minimize ripple voltage, the PFC boost converter switches and the DC-to-DC converter switches are turned on and off at the same time. However, this technique mutually modulates the switching noise, and doubles its magnitude. Furthermore, the PFC-PWM controller according to Hwang simultaneously conducts the parasitic devices of the PFC and PWM stages. This can result in the creation of a multi-resonant tank that generates substantial high frequency noise.

The objective of the present invention is to provide a PFC-PWM controller that overcomes the drawbacks of the prior art. The present invention also includes a means for reducing power consumption while the power converter is operating in standby mode.

SUMMARY OF THE INVENTION

The present invention provides a PFC-PWM controller having interleaved switching. The PFC-PWM controller includes a PFC stage, a PWM stage, a sequencer, a power manager and an oscillator. The PFC stage is used for generating a PFC signal in response to a line voltage and a first feedback voltage. The PFC signal is used to control switches of a PFC boost converter of a power converter. The PWM stage generates a PWM signal in response to a second feedback voltage. The PWM signal controls switches of a DC-to-DC converter of the power converter.

The first feedback voltage is derived from a PFC boost converter feedback loop. The second feedback voltage is derived from a DC-to-DC power converter feedback loop. The magnitudes of these feedback voltages are proportional to a load of the power converter. Conversely, the first and second feedback voltages are inversely proportional to an output voltage of the power converter.

The PFC-PWM controller includes the power manager to generate a discharge current and a burst-signal. Under light-load conditions, the discharge current is in proportion to both the first feedback voltage and the second feedback voltage. When a low-load condition is sustained longer than a first delay-time, this achieves a suspended condition. The burst-signal is generated to disable the PFC signal while the power converter is in the suspended condition.

The PFC-PWM controller includes the oscillator for generating a ramp-signal, a slope-signal and a pulse-signal. The ramp-signal and the slope-signal are synchronized with the pulse-signal, such that the pulse-signal is inserted in between the PFC signal and the PWM signal. A rising-edge of the pulse-signal disables the PFC signal. A falling-edge of the pulse-signal enables the PWM signal. A pulse width of the pulse-signal is increased in response to a decrement of the discharge current. The first feedback voltage is compared with the slope-signal to generate the PFC signal, and the second feedback voltage is compared with the ramp-signal to generate the PWM signal.

The PFC-PWM controller includes the sequencer for generating a first enable-signal and a second enable-signal. The first and second enable-signals are used to enable or disable the PFC signal and the PWM signal. Whenever the line input voltage exceeds a third threshold, this indicates a no-brownout condition. A first-state is created if the no-brownout condition sustains longer than a second delay-time. The first-state and an enabled ON/OFF signal achieve a second-state. A third-state is created if the second-state sustains longer than a third delay-time. The third-state will enable the first enable-signal when the burst-signal is disabled. Once the first feedback voltage is higher than a fourth threshold, this indicates a PFC-ready condition, in which the PFC-ready condition associates with the third-state that enable a fourth-state. When the fourth-state sustains longer than a fourth delay-time, this creates a fifth-state. The fifth-state enables the second enable-signal.

The sequencer generates a proper sequence to switch the PFC signal and the PWM signal. This protects the power converter from incorrectly operating. The pulse width of the pulse-signal ensures a dead time to be inserted after the PFC signal is turned off and before the PWM signal is turned on. This dead time spreads switching signal, such as the PWM signal and the PFC signal, and reduces switching noise. Furthermore, the pulse width of the pulse-signal is increased and a frequency of the pulse-signal is decreased in response to a decrement of the discharge current. Thus, power consumption of the power converter under light-load and zero-load conditions can be effectively reduced.

It is to be understood that both the foregoing general descriptions and the following detailed descriptions are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
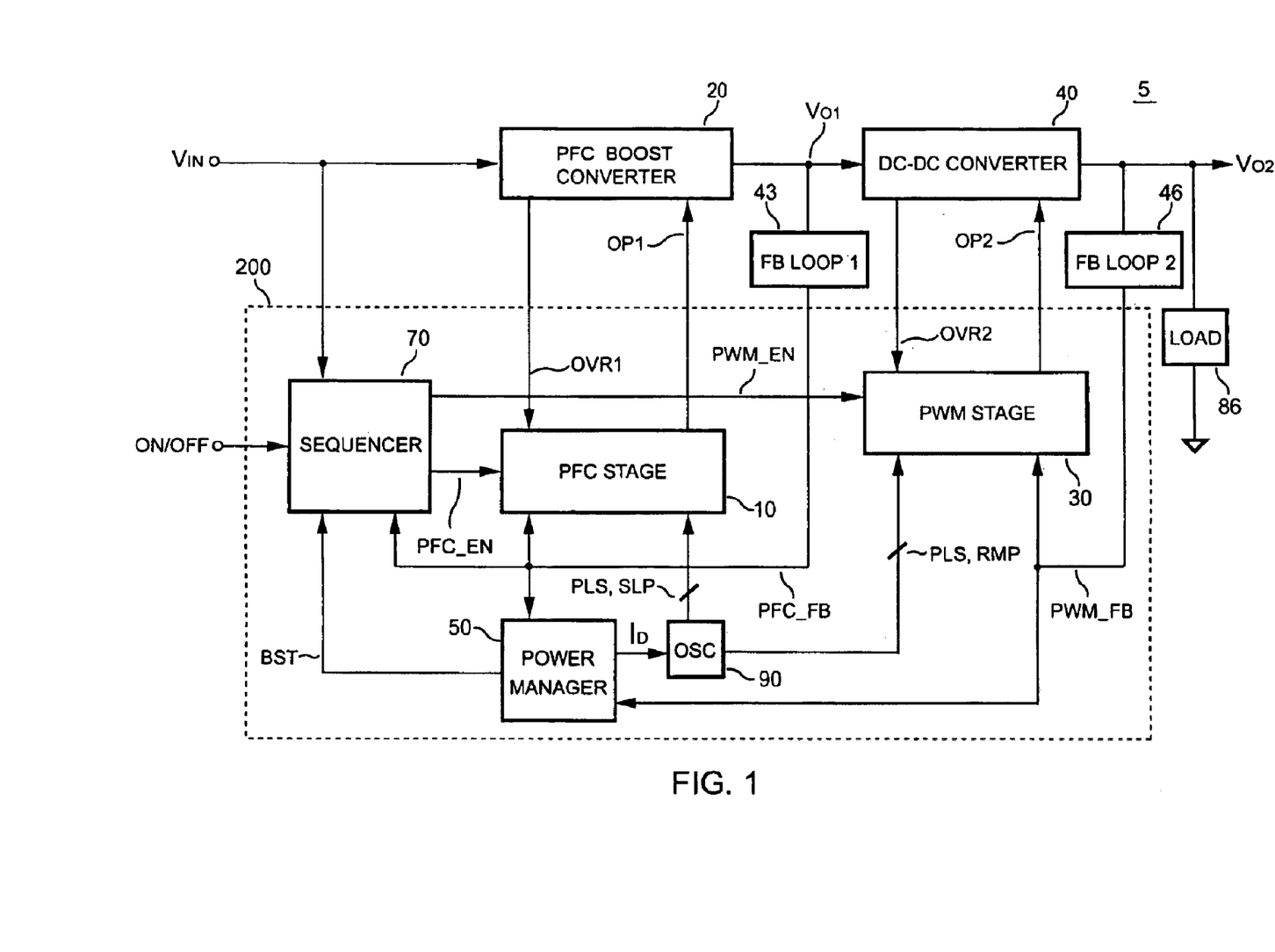
FIG. 1 shows a block diagram of a power converter including a PFC-PWM controller according to the present invention.

FIG. 1 shows a block diagram of a power converter 5 including a PFC-PWM controller 200 according to the present invention. The PFC-PWM controller 200 includes a PFC stage 10. The PFC stage 10 generates a PFC signal OP1 in response to a line voltage $V_{IN}$ and a feedback voltage PFC_FB to control the PFC boost converter 20. The feedback voltage PFC_FB is derived from a PFC boost converter feedback loop 43. When the feedback voltage PFC_FB decreases, this represents a proportional decrement of a load 86 of the power converter 5, and an increment in an output voltage $V_{O1}$ of the PFC boost converter 20.

The PFC-PWM controller 200 further includes a PWM stage 30 for generating a PWM signal OP2 in response to a feedback voltage PWM_FB. The PWM signal OP2 is used to control a DC-to-DC power converter 40. The feedback voltage PWM_FB is derived from a DC-to-DC power converter feedback loop 46. When the feedback voltage PWM_FB decreases, this represents a proportional of the load 86 of the power converter 5, and an increment in an output voltage $V_{O2}$ of the DC-to-DC power converter 40.

Figure 2:
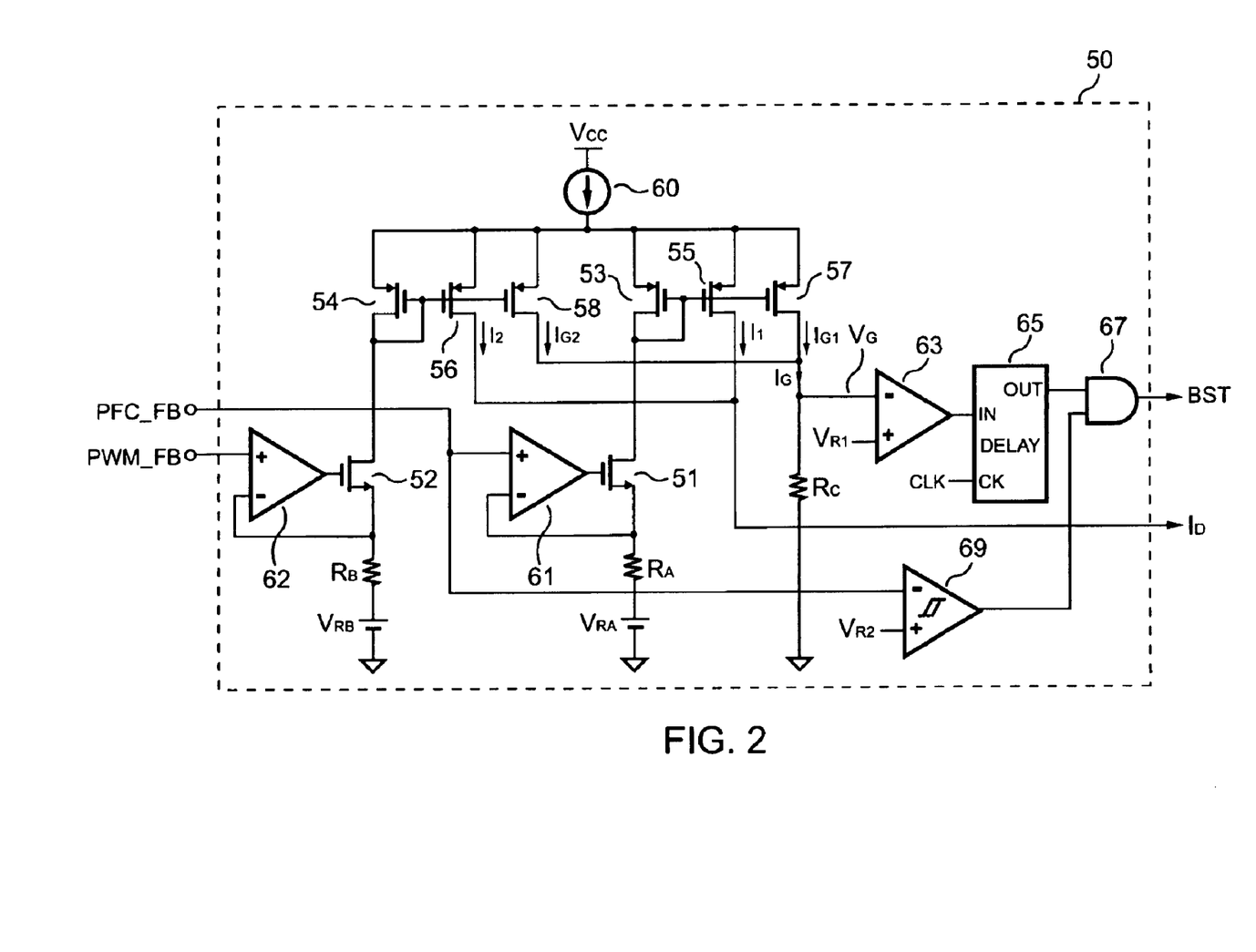
FIG. 2 shows a preferred embodiment of a power manager of the PFC-PWM controller according to the present invention.

FIG. 2 shows a power manager 50 of the PFC-PWM controller 200 according to the present invention. The power manager 50 generates a discharge current $I_D$ and a burst-signal BST. When a magnitude of the feedback voltage PFC_FB drops below a magnitude of a first green-threshold voltage $V_{RA}$, the discharge current $I_D$ will be reduced, so that it is proportional to the feedback voltage PFC_FB. When a magnitude of the feedback voltage PWM_FB drops below a magnitude of a second green-threshold voltage $V_{RB}$, the discharge current $I_D$ will be reduced, so that it is also proportional to the feedback voltage PWM_FB. Thus, a magnitude of the discharge current $I_D$ will decrease whenever the feedback voltage PWM_FB or the feedback voltage PFC_FB decreases below certain levels.

The burst-signal BST is used to disable the PFC signal OP1 under a suspended condition for power saving. When the boost-signal BST becomes logic-high, the PFC signal OP1 will be logic-low, thereby disabling the operation of the PFC boost converter 20. As FIG. 2 shows, to generate the burst-signal BST, the discharge current $I_D$ mirrors a green-current $I_G$. A magnitude of the green-current $I_G$ will be proportional to the discharge current $I_D$. The green-current $I_G$ will be converted to a green-voltage $V_G$ to be compared with a threshold voltage $V_{R1}$ in a comparator 63. When a magnitude of the green-voltage $V_G$ decreases below a magnitude of the threshold voltage $V_{R1}$, the PFC-PWM controller 200 will enter a low-load state. When the duration of the low-load state exceeds a first delay-time, the PFC-PWM controller will enter the suspended condition. The burst-signal BST will be logic-low when the feedback voltage PFC_FB exceeds a threshold voltage $V_{R2}$, while the PFC-PWM controller 200 is under the suspended condition.

Figure 3:
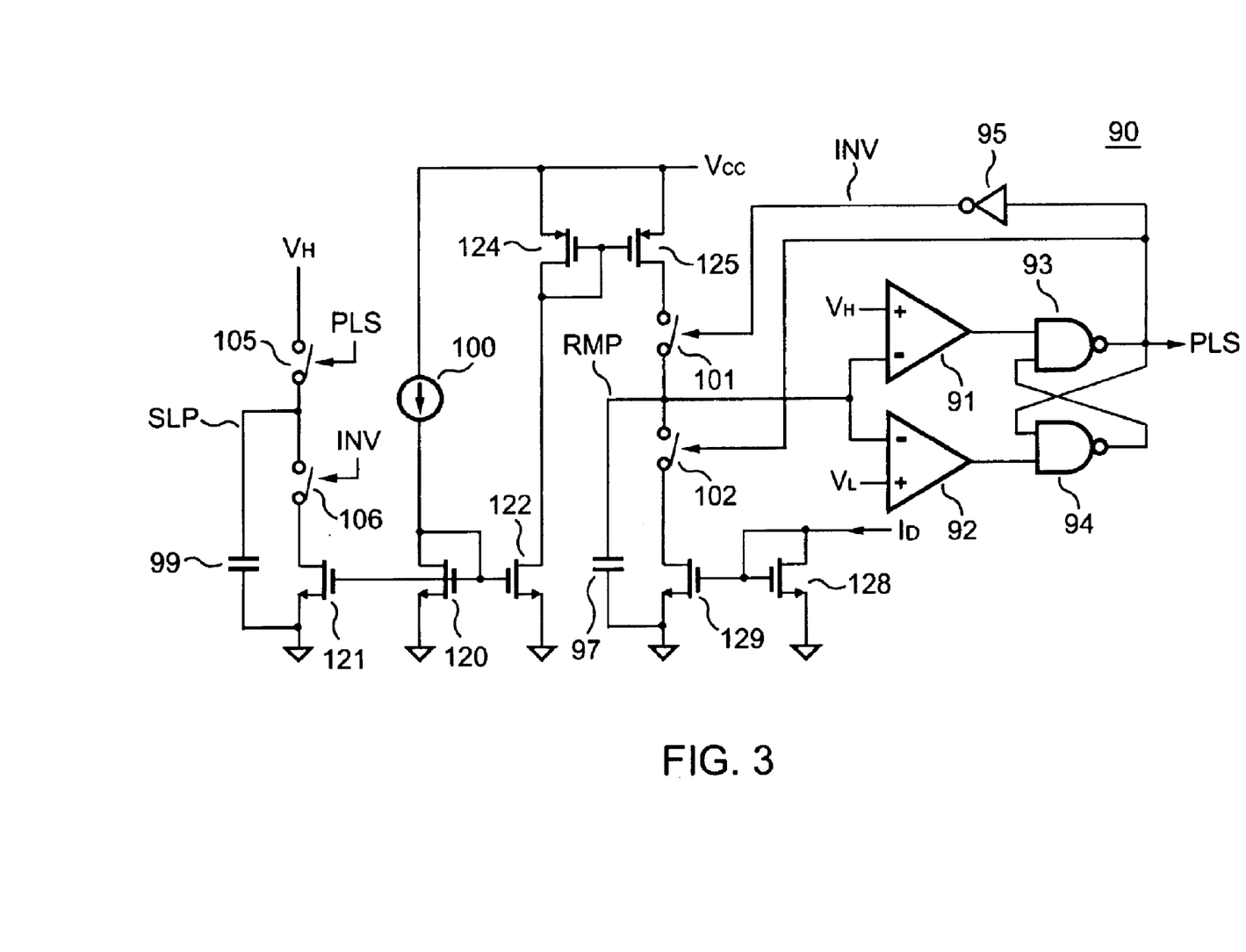
FIG. 3 shows a preferred embodiment of an oscillator of the PFC-PWM controller according to the present invention.

FIG. 3 shows an oscillator 90 of the PFC-PWM controller 200 according to the present invention. The oscillator 90 generates a ramp-signal RMP, a slope-signal SLP and a pulse-signal PLS. The ramp-signal RMP and the slope-signal SLP are synchronized with the pulse-signal PLS. The PFC signal OP1 is generated from comparing the feedback voltage PFC_FB and the slope-signal SLP. The PWM signal OP2 is generated from comparing the feedback voltage PWM_FB and the ramp-signal RMP. The rising-edge of the pulse-signal PLS disables the PFC signal OP1. The falling-edge of the pulse-signal PLS enables the PWM signal OP2. Therefore the pulse-signal PLS is inserted in between the PFC signal OP1 and the PWM signal OP2 to avoid simultaneous on/off switching.

A pulse width of the pulse-signal PLS will increase in response to a decrement in the discharge current $I_D$. Therefore, the frequency of the pulse-signal PLS is decreased under light-load and zero-load conditions. As the frequency of the pulse-signal PLS decreases, the switching frequency of the PFC signal OP1 and the PWM signal OP2 will also be reduced. Thus, the power consumption of the power converter can be reduced under light-load and zero-load conditions.

Figure 5:
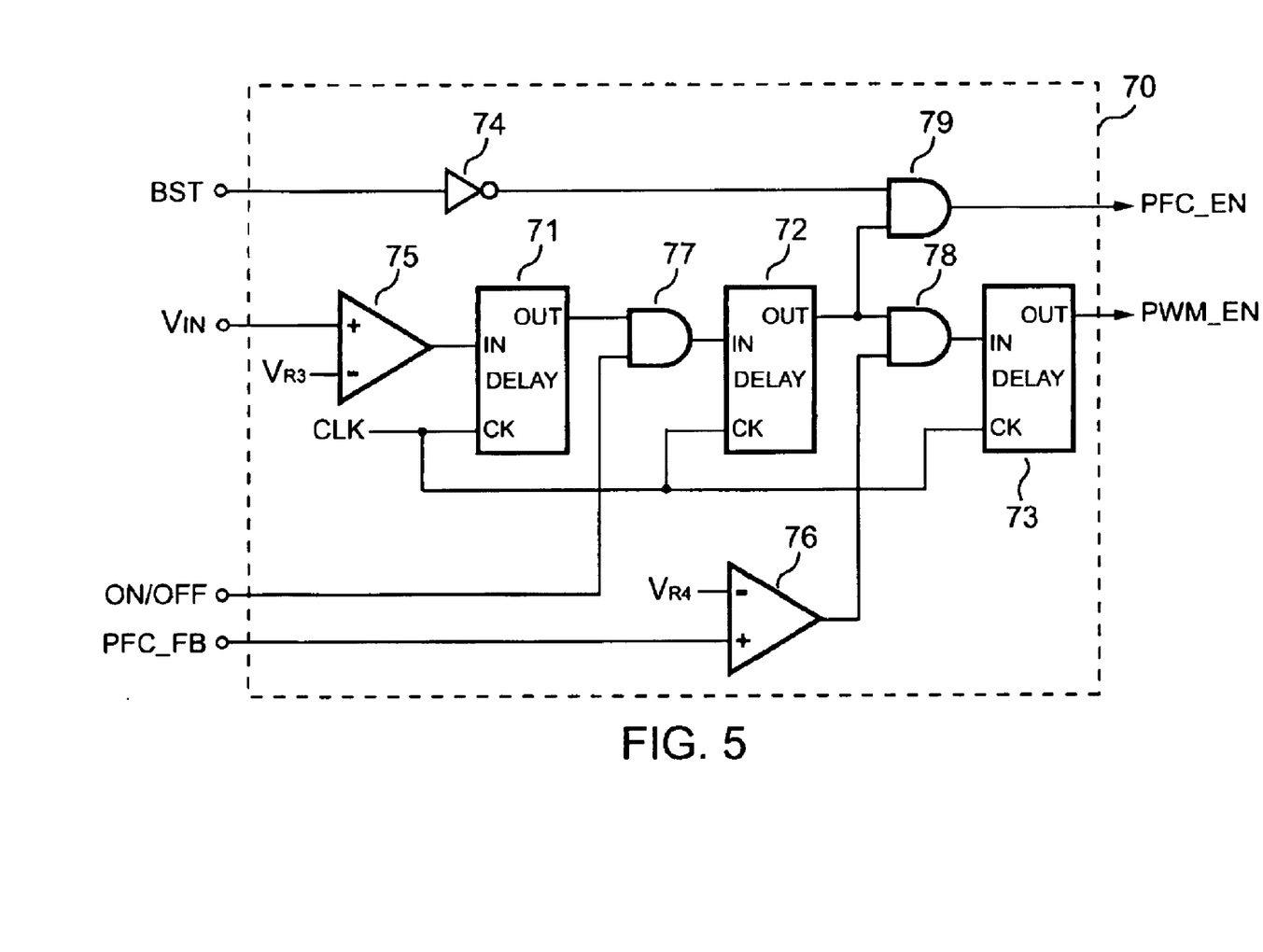
FIG. 5 shows a preferred embodiment of a sequencer of the PFC-PWM controller according to the present invention.

FIG. 5 shows a sequencer 70 of the PFC-PWM controller 200 according to the present invention. An ON/OFF signal is used to turn on the power converter 5. The sequencer 70 will generate an enable-signal PFC_EN to control the PFC signal OP1 and generates an enable-signal PWM_EN to control the PWM signal OP2.

When the line input voltage $V_{IN}$ exceeds a threshold voltage $V_{R3}$, this indicates a no-brownout condition. If the no-brownout condition is sustained longer than a second delay-time, the PFC-PWM controller 200 enters a first state. If the ON/OFF signal is enabled in the first state, the PFC-PWM controller 200 will enter a second state. When the second state is sustained longer than a third delay-time, the PFC-PWM controller 200 will enter a third state. If the burst-signal BST is disabled in the third state, the enable signal PFC_EN will be enabled. A PFC-ready condition exists whenever the feedback voltage PFC_FB exceeds a threshold voltage $VR_4$. If the PFC-ready condition exists in the third state, the PFC-PWM controller 200 will enter a fourth state. If the fourth state is sustained longer than a fourth delay-time, the PFC-PWM controller 200 will enter a fifth state. When the fifth state is active, the enable signal PWM_EN will be enabled.

The sequencer 70 protects the power converter 5 from incorrectly operating by generating a proper sequence to control the PFC signal OP1 and the PWM signal OP2. The pulse width of the pulse-signal PLS ensures a dead time $T_D$, which exists after the PFC signal OP1 is turned off and before the PWM signal OP2 is turned on. This dead time $T_D$ spreads switching signals, such as the PFC signal OP1 and the PWM signal OP2, and reduces switching noise. Furthermore, the pulse width of the pulse-signal PLS determines the maximum duty cycle of the PFC signal OP1 and the PWM signal OP2. The pulse width of the pulse-signal PLS is increased and the frequency of the pulse-signal PLS is decreased in response to the decrement of the discharge current $I_D$. Therefore, the power consumption of the power converter 5 can be reduced under light-load and zero-load conditions.

Further referring to FIG. 2, the power manager 50 includes a current source 60 supplied with a voltage source $V_{CC}$ for limiting a maximum magnitude of the discharge current $I_D$. The power manager 50 also includes a first V-I converter, consisting of an operational amplifier 61, a transistor 51, and a resistor $R_A$. When the magnitude of the feedback voltage PFC_FB exceeds the magnitude of the first green-threshold voltage $V_{RA}$, the first V-I converter will generate a first V-I current in response to the feedback voltage PFC_FB. A magnitude of the first V-I current also depends on the resistance of the resistor $R_A$. The power manager 50 also includes a second V-I converter, consisting of an operational amplifier 62, a transistor 52, and a resistor $R_B$. When the magnitude of the feedback voltage PWM_FB exceeds the magnitude of the second green-threshold voltage $V_{RB}$, the second V-I converter will generate a second V-I current in response to the feedback voltage PWM_FB. A magnitude of the second V-I current also depends on the resistance of the resistor $R_B$.

The power manager 50 also includes a first current mirror, consisting of three transistors 53, 55 and 57. A source of each of the transistors 53, 55 and 57 are connected to the current source 60. The gates of these three transistors 53, 55 and 57 are connected to a drain of the transistor 53. The first V-I current flowing via the drain of the transistor 53 drives the transistor 55 to produce a first discharge current $I_1$. The first V-I current flowing via the drain of the transistor 53 also drives the transistor 57 to produce a first green-current $I_{G1}$.

The power manager 50 also includes a second current mirror, consisting of three transistors 54, 56 and 58. A source of each of the transistors 54, 56 and 58 are connected to the current source 60. A gate of each of the transistors 54, 56 and 58 are connected to a drain of the transistor 54. The second V-I current flowing through the drain of the transistor 54 drives the transistor 56 to produce a second discharge current I2. The second V-I current flowing through the drain of the transistor 54 also drives the transistor 58 to produce a second green-current $I_{G2}$.

The first discharge current $I_1$ and the second discharge current $I_2$ are coupled together to produce the discharge current $I_D$. The first green-threshold voltage $V_{RA}$ represents a light-load threshold for the PFC boost converter 20. The second green-threshold voltage $V_{RB}$ represents a light-load threshold for the DC-to-DC converter 40. When the feedback voltage PFC_FB exceeds the first green-threshold voltage $V_{RA}$, the first discharge current $I_1$ will increase accordingly. When the feedback voltage PWM_FB exceeds the second green-threshold voltage $V_{RB}$, the second discharge current $I_2$ will increase accordingly.

The first green-current $I_{G1}$ and the second green-current $I_{G2}$ are coupled together to produce the green-current $I_G$. The green-current $I_G$ is converted to a green-voltage $V_G$ via a resistor $R_C$. The resistor $R_C$ is connected between a drain of the transistor 57 and a ground reference. The green-voltage $V_G$ is compared with the threshold voltage $V_{R1}$ in the comparator 63. A positive input of the comparator 63 is supplied with the threshold voltage $V_{R1}$. A negative input of the comparator 63 is connected to the resistor $R_C$.

The power manager 50 also includes a first delay-timer 65. The first delay-timer 65 determines the first delay-time. An input of the first delay-timer 65 is connected to an output of the comparator 63. A hysteresis comparator 69 is used to compare the feedback voltage PFC_FB with a threshold voltage $V_{R2}$. A negative input of the hysteresis comparator 69 is supplied with the feedback voltage PFC_FB. A positive input of the comparator 69 is supplied with the threshold voltage $V_{R2}$. An output of an AND gate 67 produces the burst-signal BST. An output of the first delay-timer 65 and an output of the comparator 69 are respectively connected to a first input and a second input of the AND gate 67. The burst-signal BST will become logic-low when the magnitude of the feedback voltage PFC_FB exceeds a magnitude of the threshold voltage $V_{R2}$. The burst-signal BST will be disabled when the feedback voltage PFC_FB is higher than the threshold voltage $V_{R2}$, which ensures that an output of the DC-to-DC converter 40 can be well regulated. If the magnitude of the feedback voltage PFC_FB decreases below the magnitude of the threshold voltage $V_{R2}$, the PFC boost converter 20 will be unable to supply sufficient output voltage $V_{O1}$ to the DC-to-DC converter 40. Therefore, the PFC boost converter 20 is not allowed to turn off for power saving.

Further referring to FIG. 3, the oscillator 90 includes a current source 100 for supplying a ramp-charge current of the ramp-signal RMP and a slope-discharge current of the slope-signal SLP. The oscillator 90 also includes a third current mirror consisting of three transistors 120, 121 and 122. A source of each of the transistors 120, 121 and 122 are connected to the ground reference. A gate of each of the transistors 120, 121 and 122 are connected to a drain of the transistor 120. The current source 100 drives the drain of the transistor 120 to produce the slopedischarge current via a drain of the transistor 121. The current source 100 also drives the drain of the transistor 120 to produce an osc-current via a drain of the transistor 122.

Two switches 105 and 106, and a capacitor 99 are used to generate the slope-signal SLP. The two switches 105 and 106 are controlled to alternately conduct. The two switches 105 and 106 are connected in series. A reference voltage $V_H$ is supplied to a first terminal of the switch 105. A second terminal of the switch 106 is connected to the drain of the transistor 121. The capacitor 99 is coupled to a junction of the switch 105 and the switch 106. Once the switch 105 is turned on, the capacitor 99 will be charged up to the reference voltage $V_H$.

The slope-discharge current discharges the capacitor 99 when the switch 106 is turned on. The two transistors 124 and 125 are connected to form a fourth current mirror. The sources of two transistors 124 and 125 are both supplied with the voltage source $V_{CC}$. The gates of two transistors 124 and 125 are connected to a drain of the transistor 124. The osc-current drives the drain of the transistor 124 to produce the ramp-charge current via a drain of the transistor 125. Two transistors 128 and 129 are connected to form a fifth current mirror. The sources of two transistors 128 and 129 are connected to the ground reference. The gates of the two transistors 128 and 129 are connected to a drain of the transistor 128. The discharge current $I_D$ drives the drain of the transistor 128 to produce a ramp-discharge current via a drain of the transistor 129.

Two switches 101 and 102, and a capacitor 97 are used to produce the ramp-signal RMP. The switches 101 and 102 are controlled to alternately conduct. The two switches 101 and 102 are connected in series. The ramp-charge current is supplied to a first terminal of the switch 101. A second terminal of the switch 102 is driven with the ramp-discharge current. The capacitor 97 is connected to a junction of the switch 101 and the switch 102. Once the switch 101 is turned on, the ramp-charge current will start to charge up the capacitor 97. When the switch 102 is turned on, the ramp-discharge current will discharge the capacitor 97. The negative inputs of a comparator 91 and a comparator 92 are connected to the junction of the switch 101 and the switch 102. This allows the ramp-signal RMP to be detected. A positive input of the comparator 91 is supplied with the reference voltage $V_H$. A positive input of the comparator 92 is supplied with a reference voltage $V_L$. The magnitude of the reference voltage signal $V_H$ is higher than the magnitude of the reference voltage $V_L$.

A NAND gate 93 and a NAND gate 94 are used for generating the pulse-signal PLS at an output of the NAND gate 93. The output of the NAND gate 93 is connected to a second input of the NAND gate 94. An output of the NAND gate 94 is connected to a second input of the NAND gate 93 to form a latch circuit A first input of the NAND gate 93 is connected to an output of the comparator 91. A first input of the NAND gate 94 is connected to an output of the comparator 92. An inverter 95 is used to generate an inverse pulse-signal INV. An input of the inverter 95 is connected to the output of the NAND gate 93. The pulse-signal PLS is used to enable the switches 102 and 105. The inverse pulse-signal INV is used to enable the switches 101 and 106.

Figure 4:
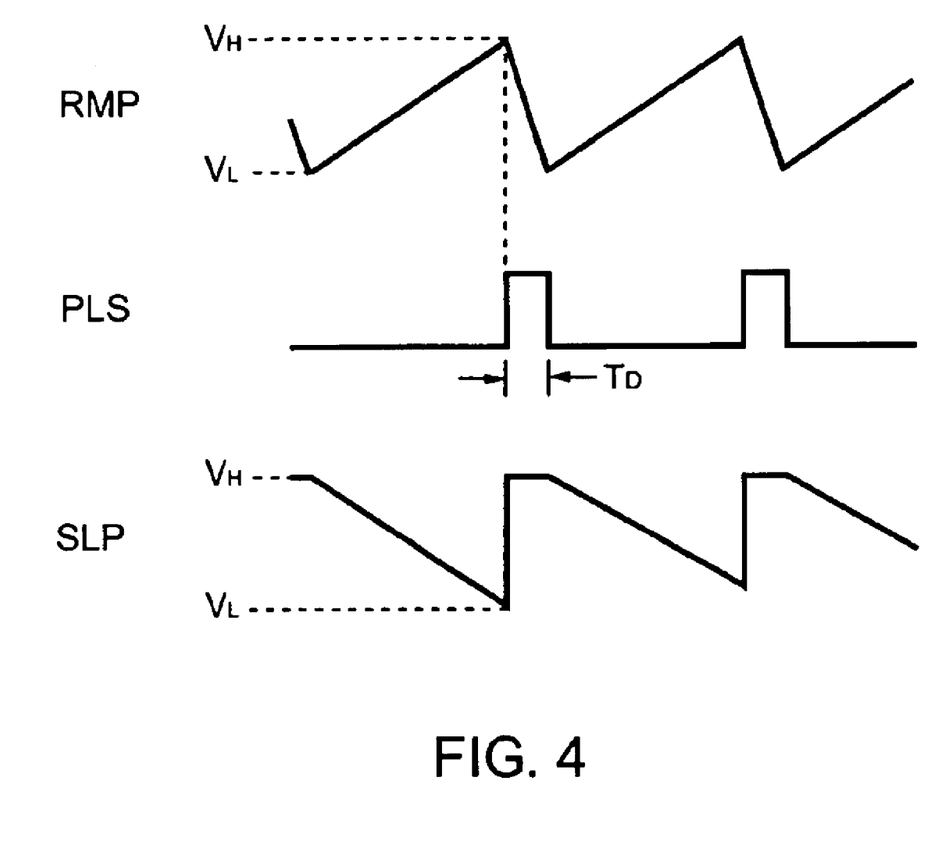
FIG. 4 is a timing diagram showing the signal waveforms of the oscillator of the PFC-PWM controller according to the present invention.

FIG. 4 shows the signal waveforms of the oscillator 90 of the PFC-PWM controller 200 of the present invention. The ramp-charge current and the capacitance of the capacitor 97 determine a rising time of the ramp-signal RMP. The pulse-signal PLS becomes logic-high once the magnitude of the ramp-signal RMP reaches the magnitude of the reference voltage $V_H$. The amplitude of the ramp-discharge current and the capacitance of the capacitor 97 determine a falling time of the ramp-signal RMP. The pulse-signal PLS will become logic-low when the ramp-signal RMP decreases to the reference voltage $V_L$. A duration of the falling time of the ramp-signal RMP also determines the dead time $T_D$ of the pulse-signal PLS.

The dead time $T_D$ of the pulse-signal PLS increases in response to the decrement of the discharge current $I_D$. The slope-signal SLP is maintained at a level of the reference voltage $V_H$ during a level of the pulse-signal PLS is logic-high. The falling time of the slope-signal SLP is generated in response to the magnitude of the slope-discharge current and the capacitance of the capacitor 99. The duration of the falling time of the slope-signal SLP is equal to the duration of the rising time of the ramp-signal RMP.

Further referring to FIG. 5, the sequencer 70 includes a comparator 75 for comparing the line input voltage $V_{IN}$ with a threshold voltage $V_{R3}$. A positive input of the comparator 75 is supplied with the line input voltage $V_{IN}$. A negative input of the comparator 75 is supplied with the threshold voltage $V_{R3}$. When the line input voltage $V_{IN}$ is sufficiently high, this indicates the no-brownout condition. A second delay-timer 71 is used to determine a second delay-time. An input of the second delay-timer 71 is connected to an output of the comparator 75. Once the no-brownout condition is sustained longer than the second delay-time, the sequencer 70 will enter a first state.

The sequencer 70 also includes an AND gate 77. A first input of an AND gate 77 is connected to an output of the second delay-timer 71. A second input of the AND gate 77 is supplied with the ON/OFF signal. When the signal supplied by an output of the AND gate 77 is high, the sequencer 70 will enter a second state.

A third delay-timer 72 is used to determine a third delay-time. When the second state is sustained longer than the third delay-time, the sequencer 70 will enter a third state. An input of the third delay-timer 72 is connected to the output of the AND gate 77. An input of an inverter 74 is supplied with the burst-signal BST. An AND gate 79 is used to produce the enable-signal PFC_EN. A first input of the AND gate 79 is connected to an output of the inverter 74. A second input of the AND gate 79 is connected to an output of the third delay-timer 72. A comparator 76 is used for comparing the feedback voltage PFC_FB with a threshold voltage $V_{R4}$. A positive input of the comparator 76 is supplied with the feedback voltage PFC_FB. A negative input of comparator 76 is supplied with the threshold voltage $V_{R4}$. When an output signal of the comparator 76 is logic-high, this indicates that the sequencer 70 is in a PFC-ready state.

The sequencer 70 also includes an AND gate 78. A first input of the AND gate 78 is connected to the output of the third delay-timer 72. A second input of the AND gate 78 is connected to an output of the comparator 76. When the signal supplied by an output of the AND gate 78 becomes logic-high, then the sequencer 70 will enter a fourth state. A fourth delay-timer 73 determines a fourth delay-time. An input of the fourth delay-timer 73 is connected to the output of the AND gate 78. If the fourth state is sustained longer than the fourth delay-time, the sequencer 70 will enter a fifth state. When the sequencer 70 is in the fifth state, the enable-signal PWM_EN will be enabled.

Figure 6:
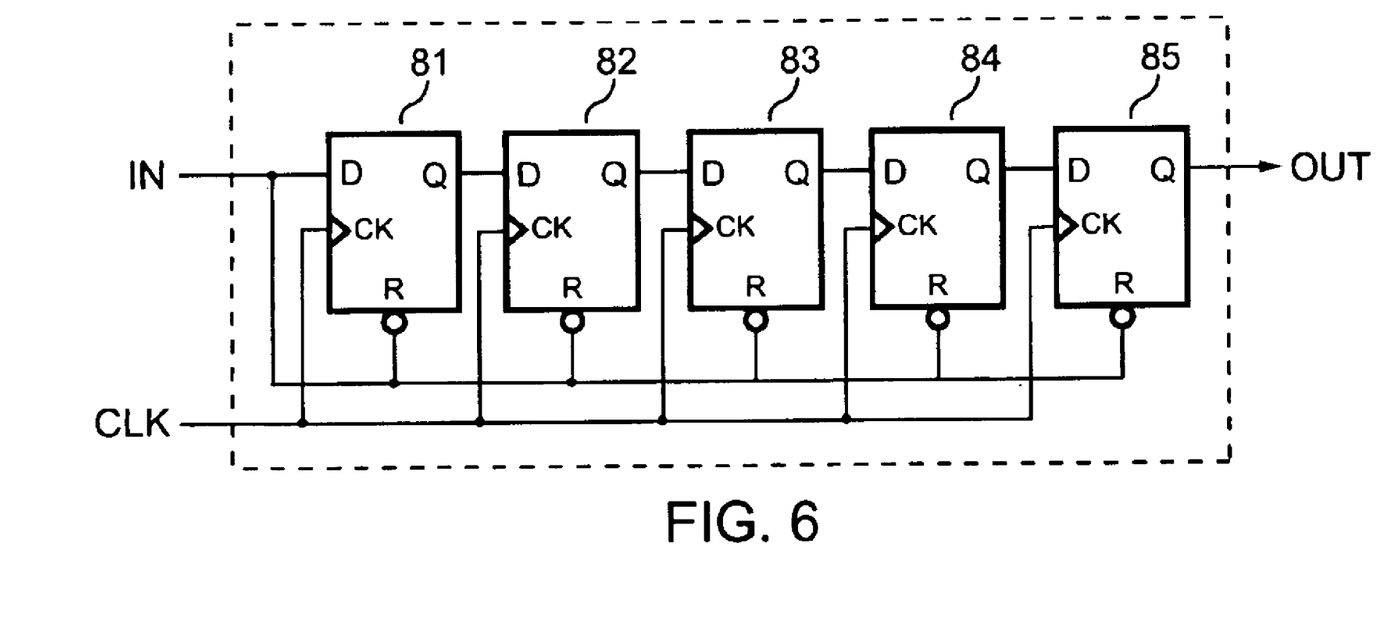
FIG. 6 shows a preferred embodiment of a delay timer according to the present invention.

FIG. 6 shows a preferred embodiment of constructing a delay-timer. The preferred embodiment of the delay timer according to the present invention is built from five cascaded flip-flops. It includes five flip-flops 81, 82, 83, 84 and 85. It is to be understood that the present invention also covers variations to this delay-timer. The delay-timer may consist of any number of cascaded flip-flops. It is also to be understood that the present invention also covers variations to this delay-timer, wherein entirely different means are used to produce a delay-time. The purpose here is simply to demonstrate one possible implementation of a delay-timer. The operation of this circuit will be well known to those skilled in the art, and therefore details thereof will not be discussed herein.

Figure 7:
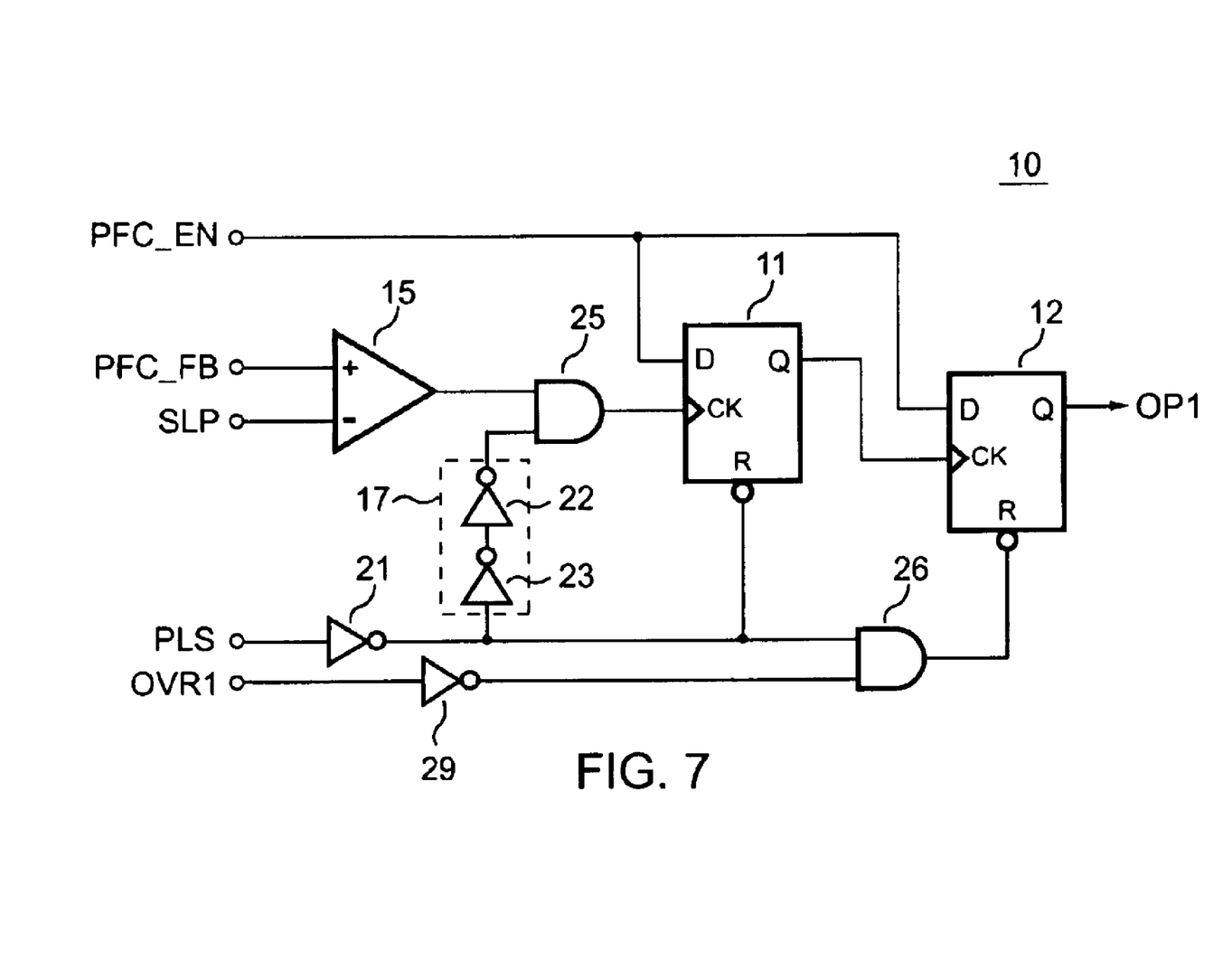
FIG. 7 shows a preferred embodiment of a PFC stage of the PFC-PWM controller according to the present invention.

FIG. 7 shows a preferred embodiment of the PFC stage 10. A comparator 15 is used for comparing the feedback voltage PFC_FB with the slope-signal SLP. A positive input of the comparator 15 is supplied with the feedback voltage PFC_FB. A negative input of the comparator 15 is supplied with the slope-signal SLP. An input of an inverter 21 is supplied with the pulse-signal PLS. An input of an inverter 29 is supplied with a protection-signal OVR1. The protection-signal OVR1 indicates the presence of fault conditions in the PFC boost converter 20, such as over-voltage, over-current, and over-temperature. A first input of an AND gate 26 is connected to an output of the inverter 21. A second input of the AND gate 26 is connected to an output of the inverter 29. A flip-flop 11 and a flip-flop 12 are used for producing the PFC signal OP1 from an output of the flip-flop 12. The D-inputs of the flip-flop 11 and 12 are both supplied with the enable-signal PFC_EN. A clock-input of the flip-flop 12 is connected to an output of the flip-flop 11. A reset-input of the flip-flop 11 is connected to the output of the inverter 21. A reset-input of the flip-flop 12 is connected to an output of the AND gate 26. A delay circuit 17, consisting of two NOT gates 22 and 23 connected in series, has an input connected to the output of the inverter 21. A first input of an AND gate 25 is connected to an output of the comparator 15. A second input of an AND gate 25 is connected to an output of the delay circuit 17. An output of the AND gate 25 is connected to a clock-input of the flip-flop 11.

Figure 8:
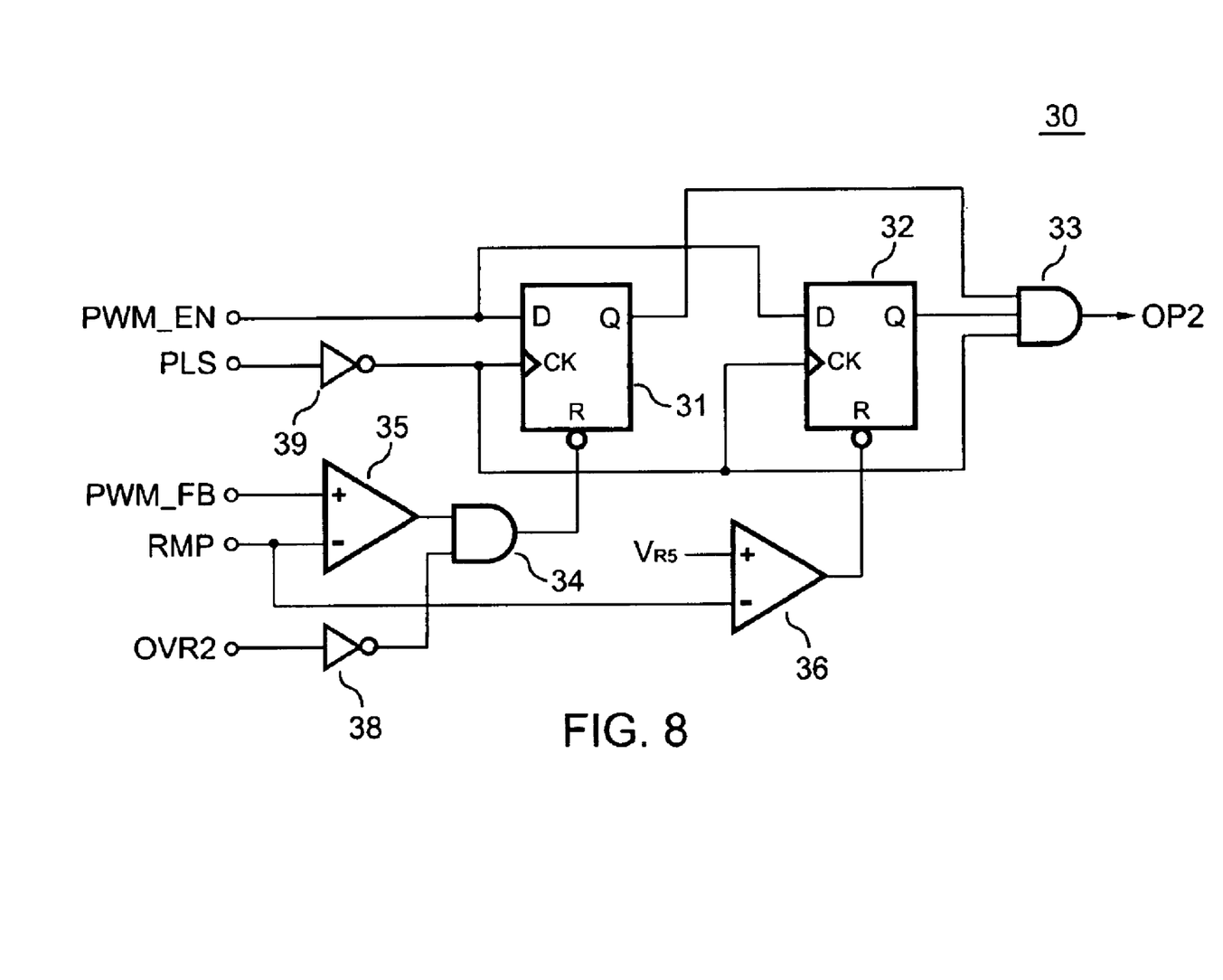
FIG. 8 shows a preferred embodiment of a PWM stage of the PFC-PWM controller according to the present invention.

FIG. 8 shows a preferred embodiment of the PWM stage 30. A comparator 35 is used for comparing the feedback voltage PWM_FB with the ramp-signal RMP. A positive input of the comparator 35 is supplied with the feedback voltage PWM_FB. A negative input of the comparator 35 is supplied with the ramp-signal RMP. An input of an inverter 39 is supplied with the pulse-signal PLS. An input of an inverter 38 is supplied with a protection-signal $OV_{R2}$. The protection-signal $OV_{R2}$ is utilized to indicate fault conditions in the DC-to-DC power converter 40, such as over-voltage, over-current and over-temperature. A first input of an AND gate 34 is connected to an output of the comparator 35. A second input of an AND gate 34 is connected to an output of the inverter 38. The D-inputs of a flip-flop 31 and a flip-flop 32 are both supplied with the enable-signal PWM_EN. The clock-inputs of the flip-flops 31 and 32 are connected to an output of the inverter 39. A reset-input of the flip-flop 31 is connected to an output of the AND gate 34. A comparator 36 is used for comparing a threshold voltage $V_{R5}$ with the ramp-signal RMP. The comparator 36 also determines a maximum duty cycle of the PWM signal OP2. A positive input of the comparator 36 is supplied with the threshold voltage $V_{R5}$. A negative input of the comparator 36 is supplied with the ramp-signal RMP. The output of the comparator 36 is connected to a reset-input of the flip-flop 32. An AND gate 33 generates the PWM signal OP2. A first input of the AND gate 33 is connected to an output of the flip-flop 31. A second input of the AND gate 33 is connected to an output of the flip-flop 32. A third input of the AND gate 33 is connected to the output of the inverter 39.

Figure 9:
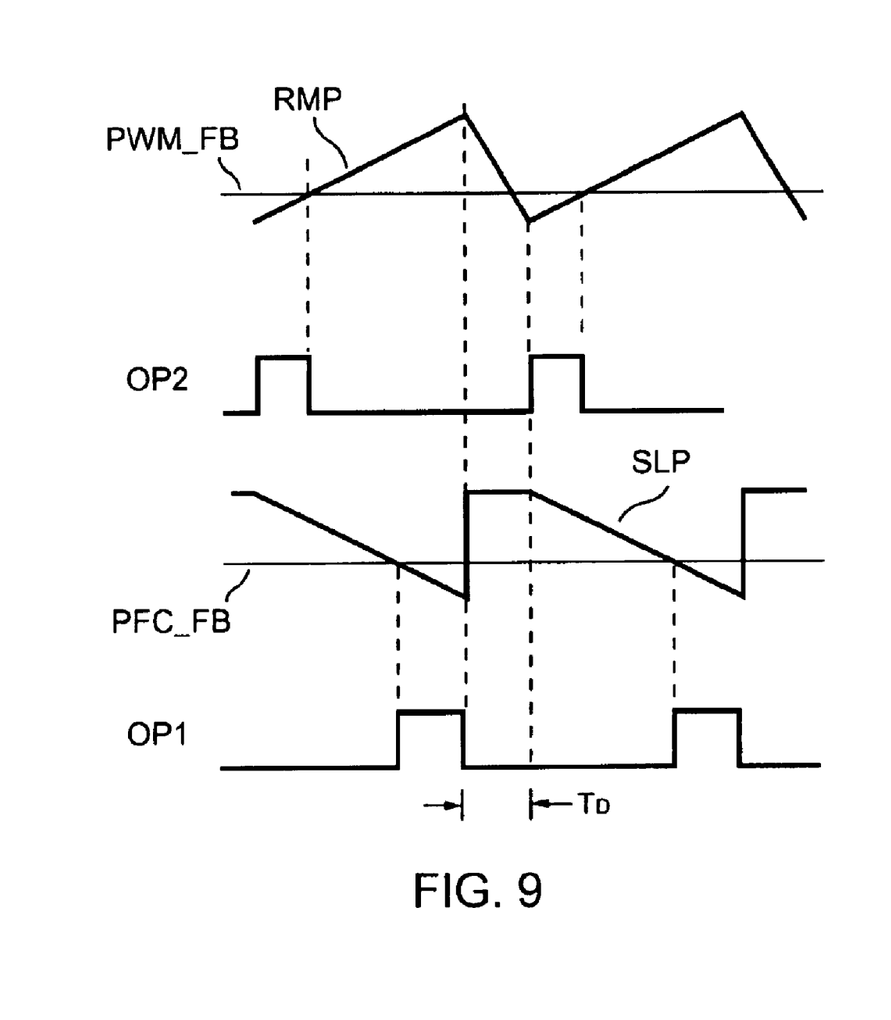
FIG. 9 is a timing diagram showing the signal waveforms of the PFC stage and the PWM stage of the PFC-PWM controller according to the present invention.

FIG. 9 is a timing diagram showing the waveforms of the PFC signal OP1, the PWM signal OP2, the ramp-signal RMP, and the slope-signal SLP. The PWM signal OP2 is high whenever the magnitude of the feedback signal PWM_FB exceeds the magnitude of the ramp-signal RMP. The PFC signal OP1 is high whenever the magnitude of the feedback signal PFC_FB exceeds the magnitude of the slope-signal SLP. The duration of the dead time $T_D$ is equal to the pulse width of the pulse-signal PLS. During the dead time $T_D$, both the PFC signal OP1 and the PWM signal OP2 are turned off.

Under light-load and zero-load conditions, the dead time $T_D$ will increase in response to the decrement in the load 86 of the power converter 5. Therefore, the switching frequency and the power consumption of the power converter can be effectively reduced.

It will be apparent to those skilled in the art that various modifications and variations can be made to the structure of the present invention without departing from the scope or spirit of the present invention. In view of the foregoing, it is intended that the present invention cover modifications and variations of this invention provided that they fall within the scope of the following claims and their equivalents.

What is claimed is:

1. A PFC-PWM controller of a power converter having interleaved switching, comprising:
   a PFC stage, for generating a PFC signal in response to a line input voltage and a first feedback voltage;
   a PWM stage, for generating a PWM signal in response to a second feedback voltage;
   a power manager, for generating a discharge current and a burst-signal;
   an oscillator, for generating a ramp-signal, a slope-signal and a pulse-signal;
   an ON/OFF signal, for turning the power converter on and off; and
   a sequencer, for generating a first enable-signal to control said PFC signal, and a second enable-signal to control said PWM signal.

2. The PFC-PWM controller of claim 1, wherein said PFC signal is used to control a PFC boost converter of said power converter, wherein said first feedback voltage is derived from a PFC boost converter feedback loop, wherein said first feedback voltage decreases whenever a load of said power converter decreases, wherein said first feedback voltage decreases whenever an output voltage of said PFC boost converter increases.

3. The PFC-PWM controller of claim 1, wherein said PWM signal is used to control a DC-to-DC converter of said power converter, wherein said second feedback voltage is derived from a DC-to-DC converter feedback loop, wherein said second feedback voltage decreases whenever said load of said power converter decreases, wherein said second feedback voltage increases whenever said output voltage of said DC-to-DC converter increases.

4. The PFC-PWM controller of claim 1, wherein said discharge current decreases whenever said first feedback voltage decreases below a first green-threshold voltage, wherein said discharge current will decrease proportionally to said first feedback voltage, wherein said discharge current decreases whenever said second feedback voltage decreases below a second green-threshold voltage, wherein said discharge current will decrease proportionally to said second feedback voltage, wherein said discharge current mirrors a green-current, wherein a green-voltage is produced in response to said discharge current.

5. The PFC-PWM controller of claim 1, wherein said burst-signal is utilized to disable said PFC signal, wherein disabling said PFC signal makes the PFC-PWM controller enter a suspended state, wherein said green-voltage is compared with a first threshold voltage, wherein whenever said green-voltage decreases below said first threshold voltage, the PFC-PWM controller will enter a low-load state, wherein whenever a duration of said low-load state exceeds a first delay-time, the PFC-PWM controller will enter said suspended state, wherein said burst-signal is disabled whenever said first feedback voltage exceeds a second threshold voltage while the PFC-PWM controller is in said suspended state.

6. The PFC-PWM controller of claim 1, wherein said ramp-signal and said slope-signal are synchronized with said pulse-signal, wherein said pulse-signal is inserted between said PFC signal and said PWM signal, wherein a rising-edge of said pulse-signal disables said PFC signal, wherein a falling-edge of said pulse-signal enables said PWM signal, wherein a pulse width of said pulse-signal increases whenever said discharge current decreases.

7. The PFC-PWM controller of claim 1, wherein said PFC signal is generated by comparing said first feedback voltage with said slope-signal, wherein said PWM signal is generated by comparing said second feedback voltage with said ramp-signal.

8. The PFC-PWM controller of claim 1, wherein said sequencer enters a no-brownout state whenever said line input voltage exceeds a third threshold voltage, wherein said sequencer transits from said no-brownout state to a first state when said no-brownout condition is sustained longer than a second delay-time, wherein said sequencer transits from said first state to a second state as said ON/OFF signal is enabled, wherein said sequencer transits from said second state to a third state when said second state is sustained longer than a third-delay time, wherein said first enable-signal will be logic-high whenever said sequencer is in the third state while said burst-signal is disabled, wherein said sequencer transits from said third state to a fourth state whenever said first feedback voltage exceeds a fourth threshold voltage, which indicates a PFC-ready condition, wherein said sequencer transits from said fourth state to a fifth state whenever said fourth state is sustained longer than a fourth delay-time, wherein said second enable-signal will be logic-high whenever said sequencer is in said fifth state.

9. The PFC-PWM controller as claimed in claim 1, wherein said pulse width of said pulse-signal ensures a dead time after said PFC signal is turned off and before said PWM signal is turned on, wherein said pulse width of said pulse-signal further determines a maximum duty cycle of said PFC signal and said PWM signal, wherein said pulse width of said pulse-signal increases and a frequency of said pulse-signal decreases whenever said discharge current decreases.

10. The PFC-PWM controller as claimed in claim 1, wherein said power manager comprises:
   a pm current source, for limiting a maximum magnitude of said discharge current;
   a first pm V-I converter, having a first pm operational amplifier, a first pm n-transistor, and a first pm resistor, wherein said first pm V-I converter generates a first pm current in response to said first feedback voltage whenever said first feedback voltage exceeds a first reference voltage;
   a second pm V-I converter, having a second pm operational amplifier, a second pm n-transistor, and a second pm resistor, wherein said second pm V-I converter generates a second pm current in response to said second feedback voltage whenever said second feedback voltage exceeds a second reference voltage;
   a first pm current mirror, consisting of a first pm p-transistor, a third pm p-transistor, and a fifth pm p-transistor, wherein sources of said first, third and fifth pm p-transistors are connected to said pm current source, wherein the gates of said first, third and fifth pm p-transistors are connected to a drain of said first pm p-transistor, wherein a first pm current drives said drain of said first pm p-transistor and produces a first discharge current via a drain of said third pm p-transistor, wherein said first pm current drives said drain of said first pm p-transistor and produces a first green-current via a drain of said fifth pm p-transistor,
   a second pm current mirror, consisting of a second pm p-transistor, a fourth pm p-transistor, and a sixth pm p-transistor, wherein sources of said second, fourth and sixth pm p-transistors are connected to said pm current source, wherein gates of said second, fourth and sixth pm p-transistors are connected to a drain of said second pm p-transistor, wherein a second pm current drives said drain of said second pm p-transistor and produces a second discharge current via a drain of said fourth pm p-transistor, wherein said second pm current further mirrors a second green-current via a drain of said sixth pm p-transistor, wherein said first discharge current and said second discharge current are coupled together to produce said discharge current;
   a green-resistor, for generating said green-voltage, wherein said first green-current and said second green-current are supplied to a first terminal of said green-resistor, wherein a second terminal of said green-resistor is connected to a ground reference;
   a pm comparator, for comparing said green-voltage with a first threshold voltage, wherein a positive input of said pm comparator is supplied with said first threshold voltage and a negative input of said pm comparator is connected to said first terminal of said green-resistor;
   a first delay-timer, for producing a first delay-time, wherein said first delay-timer has an input connected to an output of said pm comparator;
   an inhibit hysteresis comparator, for comparing said first feedback voltage with a second threshold voltage, wherein a negative input of said inhibit hysteresis comparator is supplied with said first feedback voltage and a positive input of said inhibit hysteresis comparator is supplied with said second threshold voltage; and
   a pm AND gate, for outputting said burst-signal, wherein an output of said first delay-timer and an output of said inhibit comparator are respectively connected to two inputs of said pm AND gate.

11. The PFC-PWM controller as claimed in claim 1, wherein said oscillator comprises:
   an osc current source, for producing a ramp-charge current and a slope-discharge current;
   a first osc current mirror, consisting of a first osc n-transistor, a second osc n-transistor, and a third osc n-transistor, wherein sources of said first, second and third osc n-transistors are connected to said ground reference, wherein gates of said first, second and third osc n-transistors are connected to a drain of said first osc n-transistor, wherein said osc current source drives said drain of said first osc n-transistor and produces said slope-discharge current via a drain of said second osc n-transistor, wherein said osc current source drives said drain of said first osc n-transistor and produces a mirrored osc current via said third osc n-transistor;
   a slope-charge switch, for generating said slope-signal, wherein said slope-charge switch is connected in series with a slope-discharge switch, wherein said slope-charge switch and said slope-discharge switch are controlled to alternately conduct, wherein a high-reference voltage is supplied to a first terminal of said slope-charge switch, wherein a second terminal of said slope-discharge switch is connected to said drain of said second osc n-transistor;
   a slope capacitor, for generating said slope-signal, wherein said slope capacitor is connected to a junction of said slope-charge switch and said slope-discharge switch, wherein said slope capacitor is rapidly charged up to said high-reference voltage whenever said slope-charge switch is turned on, wherein said slope capacitor is rapidly discharged by said slope-discharge current whenever said slope-discharge switch is turned on;

a second osc current mirror, consisting of a first osc p-transistor and a second osc p-transistor, wherein sources of said first and second osc p-transistors are supplied with a voltage source, wherein gates of said first and second osc p-transistors are connected to a drain of said first osc p-transistor; wherein said mirrored osc current drives said drain of said first osc p-transistor and produces a ramp-charge current via a drain of said second osc p-transistor;

a third osc current mirror, consisting of a fourth osc n-transistor and a fifth osc n-transistor, wherein sources of said fourth and fifth osc n-transistors are connected to said ground reference, wherein gates of said fourth and fifth osc n-transistors are connected to a drain of said fourth osc n-transistor, wherein said discharge current drives said drain of said fourth osc n-transistor and produces a ramp-discharge current via a drain of said fifth osc n-transistor;

a ramp-charge switch and a ramp-discharge switch, for generating said ramp-signal, wherein said ramp-charge switch is connected in series with said ramp-discharge switch, wherein said ramp-charge switch and said ramp-discharge switch are controlled to alternately conduct, wherein said ramp-charge current is supplied to a first terminal of said ramp-charge switch, wherein a second terminal of said ramp-discharge switch is connected to a drain of said fifth osc n-transistor;

a ramp capacitor, for generating said ramp-signal, wherein said ramp capacitor is connected to a junction of said ramp-charge switch and said ramp-discharge switch, wherein said ramp capacitor is charged up by said ramp-charge current whenever said ramp-charge switch is turned on, wherein said ramp capacitor is discharged by said ramp-discharge current whenever said ramp-discharge switch is turned on;

a high-side comparator and a low-side comparator, wherein the negative inputs of said high-side comparator and said low-side comparator are connected to said ramp capacitor, wherein a positive input of said high-side comparator is supplied with said high-reference voltage, wherein a positive input of said low-side comparator is supplied with a low-reference voltage;

a first NAND gate and a second NAND gate, wherein said pulse-signal is generated at an output of said first NAND gate, wherein said output of said first NAND gate is connected to a second input of said second NAND gate, wherein an output of said second NAND gate is connected to a second input of said first NAND gate, wherein a first input of said first NAND gate is connected to an output of said high-side comparator, wherein a first input of said second NAND gate is connected to an output of said low-side comparator; and an osc inverter, for generating an inverse pulse-signal, wherein an input of said osc inverter is connected to said output of said first NAND gate, wherein said pulse-signal is utilized to enable said ramp-discharge switch and said slope-charge switch, wherein said inverse pulse-signal is applied to enable said ramp-charge switch and said slope-discharge switch.

12. The PFC-PWM controller as claimed in claim 1, wherein said sequencer comprises:

a first sq comparator, for comparing said line input voltage with a third threshold voltage, wherein a positive input of said first sq comparator is supplied with said line input voltage, wherein a negative input of said first sq comparator is supplied with said third threshold voltage, wherein said first sq comparator is used to transit said sequencer into a first state;

a second delay-timer, for determining a second-delay time, wherein an input of said second delay-timer is connected to an output of said first sq comparator;

a first sq AND gate, for transiting said sequencer into a second state, wherein a first input of said first sq AND gate is supplied with said ON/OFF signal, wherein a second input of said first sq AND gate is connected to an output of said second delay-timer;

a third delay-timer, for determining a third delay-time and transiting said sequencer into a third state, wherein an input of said third delay-timer is connected to an output of said first sq AND gate;

a sq inverter, having an input supplied with said burst-signal;

a second sq AND gate, for producing said first enable-signal, wherein a first input of said second sq AND gate is connected to an output of said sq inverter, wherein a second input of said second sq AND gate is connected to an output of said third delay-timer;

a second sq comparator, for comparing said first feedback voltage with a fourth threshold voltage, wherein said second sq comparator indicates a PFC-ready condition; wherein a positive input of said second sq comparator is supplied with said first feedback voltage, wherein a negative input of said second sq comparator is supplied with said fourth threshold voltage;

a third sq AND gate, for transiting said sequencer into a fourth state, wherein a first input of said third sq AND gate is connected to said output of said third delay-timer, wherein a second input of said third sq AND gate is connected to an output of said second sq comparator; and a fourth delay-timer, for producing a fourth delay-time and transiting said sequencer into a fifth state, wherein an input of said fourth delay-timer is connected to an output of said third sq AND gate, wherein said second enable-signal is logic-high whenever said sequencer is in said fifth state.

13. The PFC-PWM controller as claimed in claim 1, wherein said PFC stage comprises:

a pfc comparator, for comparing said first feedback voltage with said slope-signal, wherein a positive input of said pfc comparator is supplied with said first feedback voltage and a negative input of said pfc comparator is supplied with said slope-signal;

a first pfc inverter, having an input supplied with said pulse-signal;

a second pfc inverter, having an input supplied with a first protection signal;

a first pfc AND gate having a first input connected to an output of said first pfc inverter, said first pfc AND gate having a second input connected to an output of said second pfc inverter;

a first pfc flip-flop and a second pfc flip-flop, for producing said PFC signal at an output of said second pfc flip-flop, wherein D-inputs of said first pfc flip-flop and said second pfc flip-flop are supplied with said first enable-signal, wherein a clock-input of said second pfc flip-flop is connected to an output of said first pfc flip-flop, wherein a reset-input of said first pfc flip-flop is connected to said output of said first pfc inverter, wherein a reset-input of said second pfc flip-flop is connected to an output of said first pfc AND gate;

a delay circuit, having an input connected to said output of said first pfc inverter; and a second pfc AND gate, having two inputs respectively connected to an output of said pfc comparator and to an output of said delay circuit, wherein an output of said second pfc AND gate is connected to a clock-input of said first pfc flip-flop.

14. The PFC-PWM controller as claimed in claim 1, wherein said PWM stage comprises:

a first pwm comparator, for comparing said second feedback voltage with said ramp-signal, wherein a positive input of said first pwm comparator is supplied with said second feedback voltage, and a negative input of said first pwm comparator is supplied with said ramp-signal;

a first pwm inverter, having an input supplied with said pulse-signal;

a second-pwm inverter, having an input supplied with a second protection signal;

a first pwm AND gate, having two inputs respectively connected to an output of said first pwm comparator and an output of said second pwm inverter;

a first pwm flip-flop and a second pwm flip-flop, wherein D-inputs of said first pwm flip-flop and said second pwm flip-flop are supplied with said second enable-signal, wherein clock-inputs of said first pwm flip-flop and said second pwm flip-flop are connected to an output of said first pwm inverter, wherein a reset-input of said first pwm flip-flop is connected to an output of said first pwm AND gate;

a second pwm comparator, for comparing a fifth threshold voltage with said ramp-signal and determining a maximum duty cycle of said PWM signal, wherein a positive input of said second pwm comparator is supplied with said fifth threshold voltage, wherein a negative input of said second pwm comparator is supplied with said ramp-signal, wherein an output of said second pwm comparator is connected to a reset-input of said second pwm flip-flop; and a second pwm AND gate, for generating said PWM signal, wherein a first input of said second pwm AND gate is connected to an output of said first pwm flip-flop, wherein a second input of said second pwm AND gate is connected to an output of said second pwm flip-flop, wherein a third input of said second pwm AND gate is connected to said output of said first pwm inverter.

* * * * *